Sept. 16, 1958    M. L. BECK    2,851,812
FISHING ROD HOLDER AND TENDER
Filed Dec. 28, 1955    2 Sheets-Sheet 1

Melvin L. Beck
INVENTOR.

BY Clarence A. O'Brien
and Harvey B. Jacobson
Attorneys

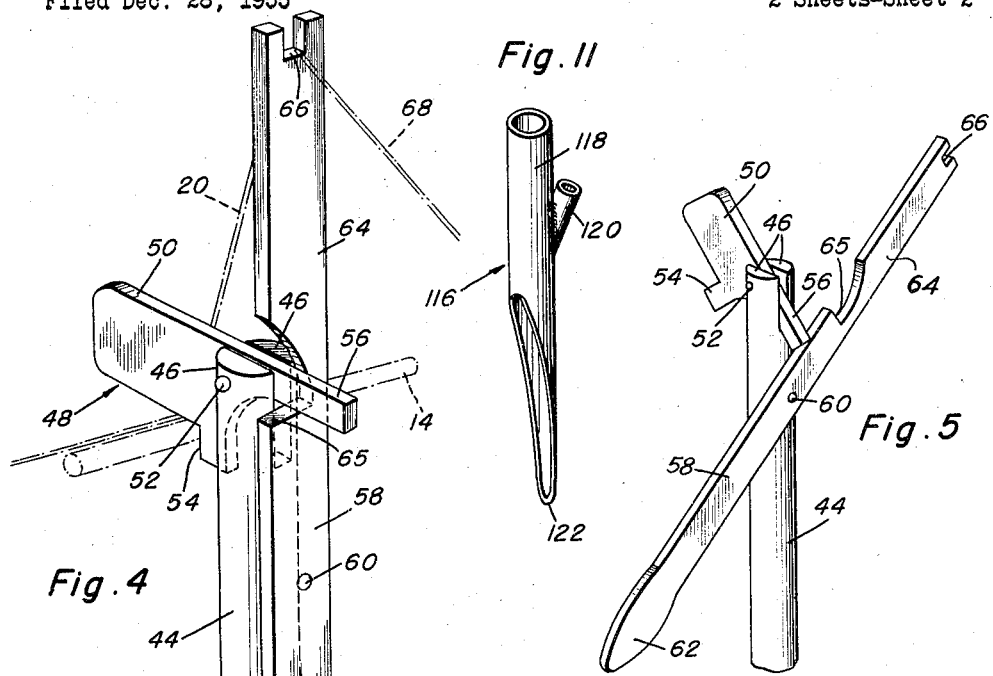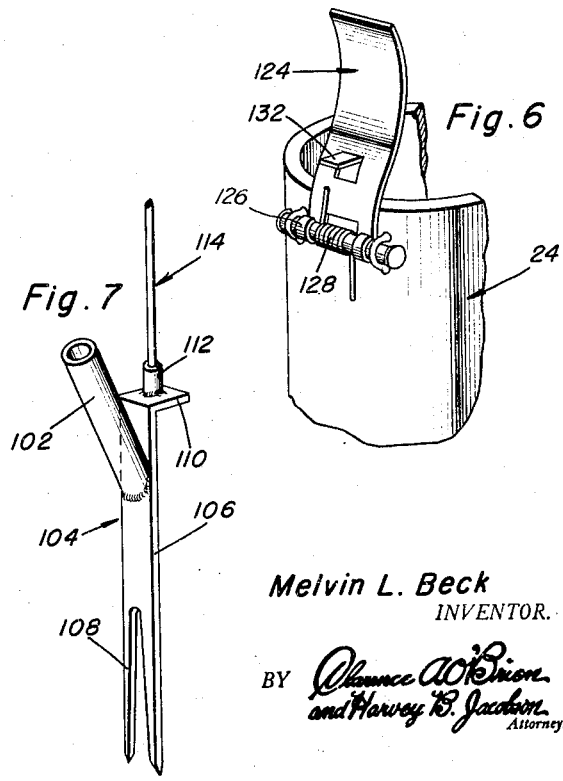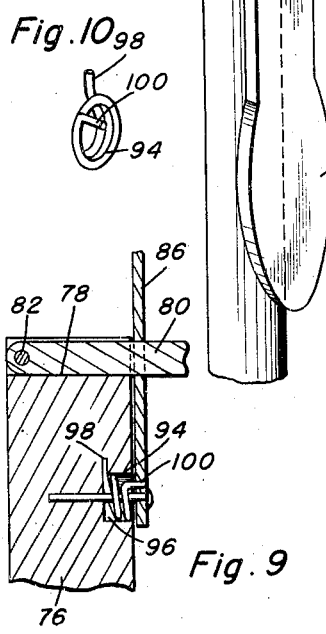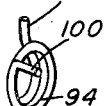
Sept. 16, 1958     M. L. BECK     2,851,812
FISHING ROD HOLDER AND TENDER
Filed Dec. 28, 1955     2 Sheets-Sheet 2
Melvin L. Beck
INVENTOR.

United States Patent Office 2,851,812
Patented Sept. 16, 1958

2,851,812

FISHING ROD HOLDER AND TENDER

Melvin L. Beck, Darrouzett, Tex.

Application December 28, 1955, Serial No. 555,913

6 Claims. (Cl. 43—15)

The present invention relates to a temporarily usable holder and tender for a conventional fishing rod, reel and line assembly and has reference in particular to a single and practical mechanical device which not only holds the rod in a fishing position but also tends the rod in that means is provided thereon through the medium of which the rod is held in a longitudinally bowed position and under tension and when released forcibly jerks the line and baited hook to make the catch in a well known manner.

An object of the invention is to provide a rod holder and tender which permits ready access to be had to the rod promptly after the tensioned portion thereof has been brought into play, whereby the rod may then be picked up and held and hand-fished in the manner usually follower by anglers.

The preferred embodiment of the invention, briefly stated, will be characterized by a holder embodying a socket member. The socket member is constructed in one of several ways so that it may be held in position on a relatively stationary support, for example on a wharf, the gunwale of a fishing boat, or on shore as the case may be. The handle portion of the fishing rod is fitted telescopically and removably in the socket member in readiness to be withdrawn, picked up and used.

It is also an object of the invention to permit the flexible portion of the fishing rod to be flexed by hand and longitudinally bowed and thus placed under tension. To this end a socket member is provided with a reach arm or equivalent latch and a releasable rod engaging and holddown device is operatively mounted on the upper portion of the arm in order that the flexed free end of the rod may be engaged with and by said latch and temporarily held under tension and in readiness to forcibly yank the baited fishing line.

Another object is to provide a holder, reach arm, pivoted holddown latch, and pull actuated line released trigger means carried by the reach arm and releasably engaged with the holddown latch so that as soon as the trigger and latch are released by the pull on the line, the pivoted latch comes into play and trips the rod with the result that the tension stored in the rod provides the means which yanks the line in a manner to make the catch.

Other objects, features and advantages will become more readily apparent from the following description and the accompanying sheets of drawings.

In the drawings:

Fig. 4 is an enlarged fragmentary perspective view of the upper end portion of the reach arm showing the rod holddown means and line tripped trigger or equivalent means;

Fig. 5 is a smaller fragmentary perspective view similar to Fig. 4 but showing how the parts look after the pull on the line has released the trigger and latch;

Fig. 6 is a fragmentary perspective view showing a reel thumbing or brake device;

Fig. 7 is a perspective view of a modified form of holder;

Fig. 9 is a fragmentary section on the line 9—9 of Fig. 8;

Figure 10 is a perspective view of the trigger return spring seen in Fig. 9; and Fig. 11 is a perspective view of a further modified form of rod holder.

Figure 1:
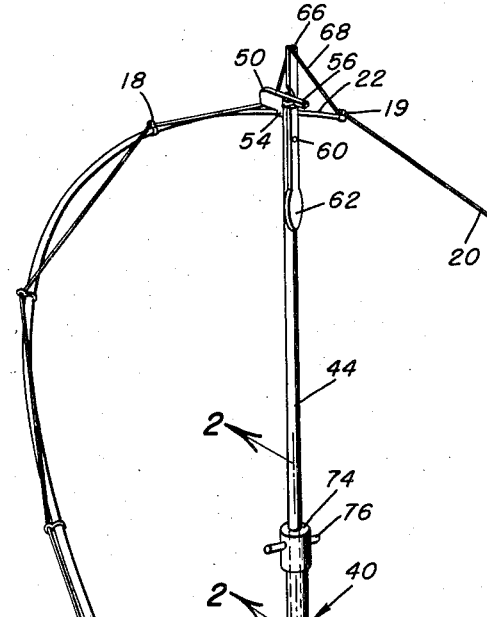
Fig. 1 is a perspective view of the improved fishing rod holder and tender and showing how it is preferably constructed and used.

Attention is directed first to Figs. 1 to 5 inclusive. In Fig. 1 the fishing rod is denoted by the numeral 12 and is characterized by a suitable flexibly resilient rod 14, a handle or hand-grip 16 at one end, eyes 18 and 19 for the fishing line 20, the eye 19 being on the extreme outer end 22 of the fishing rod.

Figure 2:
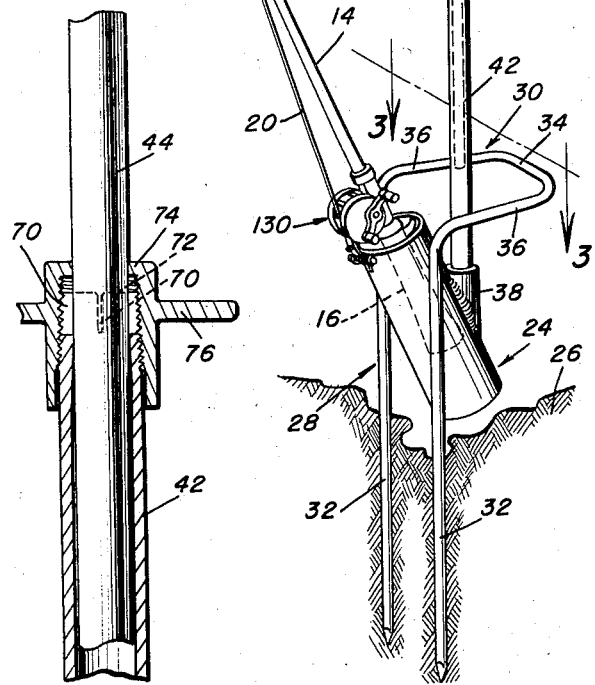
Fig. 2 is an enlarged fragmentary view in elevation and section on the vertical line 2—2 of Fig. 1.
Figure 3:
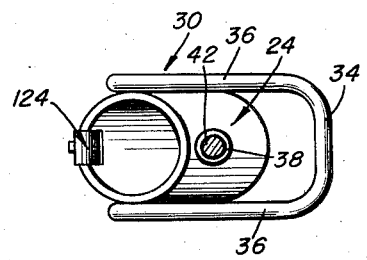
Fig. 3 is an enlarged view on the horizontal line 3—3 of Fig. 1.

The holder is denoted generally by the numeral 24 and is preferably a receiver into which the rod handle 16 is telescopically and removably seated in readiness for insertion or withdrawal. More specifically this is a socket member which is preferably mounted at an oblique angle with the upper end open. It is intended that the socket member shall be anchored or held in a given or selected position on a relatively stationary support in different ways. In Fig. 1 the shore or ground 26 is shown. Such being the case the anchor employed is denoted by the numeral 28 and is a rod or equivalent stand, that is a stand fashioned from a length of rod bent between its ends to provide a U-shaped portion 30 and a pair of depending limbs 32 having pointed lower ends and providing ground anchoring stakes. The bight portion of the U is denoted by the numeral 34 and the arms or limbs by the numerals 36. The socket member is welded in the oblique angled position shown between the upper portions of the legs 32. On one side of the socket member is an auxiliary smaller socket member 38 which is shown supporting the relatively stationary upwardly extending reach arm 40. The latter comprises a lower tubular section 42 either permanently or removably connected at its lower end with the socket member 38. There is an extensible and retractible upper arm section 44 and the upper end of this is bifurcated to provide furcations 46. The means which serves to hold the rod in longitudinally bowed and flexed position under tension is here denoted by the numeral 48 and comprises a holddown latch or finger 50. This is hinged between the furcations as at 52. It has a depending lug 54 which serves as a guard and tends to keep the cooperating portion of the fishing line from getting accidentally caught either between the furcations or between the holddown latch and furcations. The right-hand end portion of the holddown finger has an extension which constitutes a trip element or member 56. The numeral 58 designates a trigger which is pivotally mounted intermediate its ends as at 60 on one side of the upper end portion of the extensible and retractable section 44 of the reach arm. This has a weighted lower end 62 which assists in returning the trigger to a normal perpendicular latching position (Fig. 4). There is a notch 65 formed above the pivot and this provides a shoulder or keeper for the trip element 56. The upper end portion 64 is notched to define a fork 66 with which a portion 68 of the fishing line is releasably engaged in a manner best shown in Figure 1. As here seen, the line 20 passes through the eye 19 on the extreme outer end of the rod where it is then releasably engaged with the forked upper end of the trigger. It is then brought down and extended underneath of the holddown or latch when the latter is in its set, ready to function position. As stated, the depending part 54 is merely a guard and serves to minimize fouling. Assuming, then, that the device is set up as seen in Figure 1, the handle 16 is fitted removably and telescopically into the receiver or socket member 24. The rod is flexed by hand and the holddown finger 50 is latched in place. The outer end portion of the rod is engaged beneath the holddown finger, and thus the rod is not only flexed or bowed but is placed under tension. It is this stored tension which provides the necessary forcible jerk which, when exerted on the fishing line, serves to yank the line and make the catch in a now well-known manner. As shown in Figure 2, the upper end of the tubular section 42 is circumferentially slitted as at 70 to provide grips 72 which are externally screw threaded to accommodate the internal threads on the collar-like cap 74. This is provided with diametrically opposite handles 76. Thus, a suitable "chuck" is provided, and hence the sections 42 and 44 are adjustably joined. When the device is not in use, the chuck is loosened and the section 44 slides and telescopes into the section 42 to render the over-all device compact and convenient for handling, storage and erection.

Figure 8:
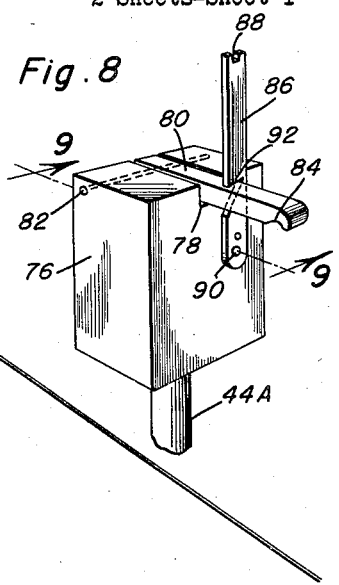
Fig. 8 is a fragmentary perspective view showing a modified latch and trigger construction on the upper end of the reach arm.

If desired, the upper end of the reach arm section may be constructed as shown in Figure 8, where the section is denoted by the numeral 44A. Here there is a block 76 atop the upper end which is bifurcated to provide a notch 78 in which the holddown finger or latch 80 is arranged and pivotally mounted as at 82. An end portion of the holddown finger projects beyond one surface of the block where it is fashioned, as at 84, to engage the bent or flexed fishing rod in an obvious manner. Here the trigger is denoted at 86, has a kerf 88 in the upper end for the line, and is pivotally mounted on the block as at 90 and has a keeper notch 92 releasably engaging the holddown finger. A suitable coil or return spring 94 is provided and mounted in a socket or pocket 96, as shown in Figure 9, with one end 98 anchored in the block and the other end 100 attached to the trigger latch.

The holder in Figure 7 comprises a socket member 102 having an L-shaped bracket 104 with a vertical leg 106 which is forked at its bottom as at 108 to be anchored in the ground. The lateral arm or portion 110 has the auxiliary socket 112 connected thereto to accommodate the reach arm 114.

The holder in Figure 11 is denoted at 116 and comprises a socket member 118 with an auxiliary socket member 120 on one side and with the lower end suitably sharpened as at 122 to be anchored in the ground.

With reference now to Figure 6, this discloses a friction brake or so-called thumbing device which is in the form of a metal or equivalent clip 124 which is suitably bent in shape so that one end portion 126 may be hingedly mounted on one side of the upper open end of the socket member 24. The numeral 128 designates a retaining and return spring which serves to press the thumbing device against the line on the reel 130 in the manner generally evident from Figure 1. The numeral 132 is a simple finger grip for releasing the thumbing device from the line on the reel for taking up any undesirable slack line.

Reviewing the construction and arrangement seen in Figure 1 wherein the rod is flexed and tensioned, it is self-evident as to just what happens when the fish takes the line, exerts the necessary pull and releases the trigger. The trigger latch moves, for example, to the position shown in Figure 5 and releases the holddown finger, with the holddown finger releasing the tensioned fishing rod to automatically make the catch.

What is claimed as new is as follows:

1. A mechanical fishing rod tender comprising, in combination, rod holding means adapted to permit the handle portion of a conventional-type reel-equipped fishing rod to be removably supported thereby so that the flexible portion of the rod may extend upwardly and beyond the upper end of said holding means in a manner to be manually flexed and thus tensioned, a rigid but extensible and retractible reach arm having its lower end rigidly attached to and supported from said holding means and having its upper end free and reaching up to a predetermined point for cooperation with the flexible portion of said fishing rod, a latch pivotally mounted on said upper end and swingable in a vertical plane on a horizontal pivoting axis, one end of said latch constituting a rod holddown finger and being releasably engageable with a selected portion of the rod when it is flexed in a manner to place said flexible portion under inherently responsive ready-to-operate tension, and a fishing line operated trigger disposed at right angles to the latch, pivotally mounted on said upper end and having a shoulder releasably engageable with a trippable portion of said latch, the upper end portion of said trigger having a notch therein for releasable reception of said fishing line.

2. The structure defined in claim 1 and wherein the upper end of said reach arm has a notch formed therein, said latch being cooperable with and partially seated for operation in said notch.

3. The structure defined in claim 1 and wherein the upper end of said reach arm has a notch formed therein, said latch being cooperable with and partially seated for operation in said notch, said latch having a depending lug cooperating with one open end of the notch and serving as an anti-fouling guard for the portion of the fishing line which cooperates with said holddown finger.

4. A mechanical fishing rod tender comprising, in combination, rod holding means embodying a socket member having means thereupon whereby it may be mounted for temporary use on a relatively stationary support, said socket member being adapted to permit the handle portion of a conventional-type, reel-equipped fishing rod to be removably inserted and temporarily held therein so that the flexible portion of the rod may extend upwardly and beyond the upper end of the socket member in a manner to be manually flexed and thus tensioned, a rigid but extensible and retractible reach arm having its lower end rigidly attached to and supported from said socket member and having its upper end free and reaching up to a predetermined point for cooperation with the flexible portion of said fishing rod, a latch pivotally mounted on said upper end and swingable in a vertical plane on a horizontal pivoting axis, one end of said latch projecting laterally beyond said upper end and constituting a rod holddown finger and being releasably engageable with a selected portion of the rod when it is flexed in a manner to place said flexible portion under inherently responsive ready-to-operate tension, and a fishing line operated trigger disposed at right angles to the latch, pivotally mounted on said upper end and having a notch in its upper end for releasable reception of a cooperating portion of the fishing line, and having a further notch in one side providing a shoulder which is releasably engageable with a trippable portion of said latch, the lower end of said trigger being weighted.

5. The structure defined in claim 4 and in combination, a spring-biased manually actuatable thumbing and reel braking member pivotally mounted for operation on said holder in a position for cooperation with the reel on said fishing rod.

6. A mechanical fishing rod tender comprising, in combination, rod holding means embodying a socket member having means thereon whereby the socket member may be temporarily mounted for use on a suitable relatively stationary support, a fishing rod of a conventional-type having a reel-equipped handle at its lower end and the usual flexible rod portion, said handle being telescopically and removably fitted for temporary retention in the socket portion of said socket member so that the flexible rod portion may extend upwardly and beyond the upper end of the socket member, a rigid but longitudinal extensible and retractable reach arm having its lower end rigidly attached to and supported from one side of said socket member and having its upper end notched and reaching up to a predetermined position for cooperation with the flexible portion of said fishing rod, a latch pivotally mounted between its ends on said upper end and having a portion thereof seated for operation in the notch, one end portion of said latch projecting beyond said upper end and constituting a holddown finger for the flexible portion of said rod, the other end portion of said latch projecting beyond a diametrically opposite side of said upper end and constituting a trip, and a trigger pivotally mounted intermediate its ends on the upper end of said reach arm for cooperation with the notch and latch, said trigger being provided with a notch providing a shoulder which is releasably engageable with said trip, the upper end of said trigger being provided with a notch for releasable reception of a cooperating portion of a fishing line carried by said rod and reel.

References Cited in the file of this patent

UNITED STATES PATENTS

| | | |
|---|---|---|
| 202,818 | Hesse | Apr. 23, 1878 |
| 783,169 | Ball | Feb. 21, 1905 |
| 2,177,912 | Spitz et al. | Oct. 31, 1939 |
| 2,473,778 | Benes | June 21, 1949 |